United States Patent
Aboytes

(10) Patent No.: US 12,527,576 B2
(45) Date of Patent: Jan. 20, 2026

(54) REINFORCEMENT DEVICE FOR INTRASACCULAR TREATMENT OF AN ANEURYSM

(71) Applicant: Maria G. Aboytes, Palo Alto, CA (US)

(72) Inventor: Maria G. Aboytes, Palo Alto, CA (US)

(*) Notice: Subject to any disclaimer, the term of this patent is extended or adjusted under 35 U.S.C. 154(b) by 462 days.

(21) Appl. No.: 17/382,312

(22) Filed: Jul. 21, 2021

(65) Prior Publication Data
US 2022/0022882 A1  Jan. 27, 2022

Related U.S. Application Data

(60) Provisional application No. 63/060,143, filed on Aug. 3, 2020, provisional application No. 63/056,466, filed on Jul. 24, 2020.

(51) Int. Cl.
*A61B 17/12* (2006.01)
*A61B 17/00* (2006.01)
*A61B 90/00* (2016.01)

(52) U.S. Cl.
CPC .. *A61B 17/12113* (2013.01); *A61B 17/12163* (2013.01); *A61B 17/12172* (2013.01); *A61B 2017/00477* (2013.01); *A61B 2017/1205* (2013.01); *A61B 2090/3966* (2016.02)

(58) Field of Classification Search
CPC ........ A61B 17/12113; A61B 17/12163; A61B 17/12172; A61B 2017/00477; A61B 2017/1205; A61B 17/12168; A61B 17/12145; A61B 17/12109
See application file for complete search history.

(56) References Cited

U.S. PATENT DOCUMENTS

2018/0036012 A1* 2/2018 Aboytes ........... A61B 17/12172

OTHER PUBLICATIONS

Definition of "mesh". Merriam-Webster Dictionary. https://www.merriam-webster.com/dictionary/mesh. 2009.*
Merriam-webster dictionary. Definiton of "dynamically". Apr. 2009. https://www.merriam-webster.com/dictionary/dynamically.*

* cited by examiner

*Primary Examiner* — Sarah W Aleman
*Assistant Examiner* — Mikail A Mannan
(74) *Attorney, Agent, or Firm* — Steven Stupp

(57) ABSTRACT

A reinforcement device is described. This reinforcement device may include mesh elements (such as two mesh elements) arranged in a sequence and spatially offset from each other along a sequence direction, where a given mesh element includes a sack having a mesh wall, an opening defined by a border, and an orientation along a normal direction perpendicular to the opening. Moreover, the reinforcement device may include one or more connectors, where a given connector has a length and is mechanically coupled to adjacent mesh elements in the sequence. Note that the one or more connectors may be configured to or may allow the orientation of the given mesh element to change, independent of orientations of a remainder of the mesh elements, by rotating about a longitudinal direction in a plane of the opening and perpendicular to the orientation.

18 Claims, 4 Drawing Sheets

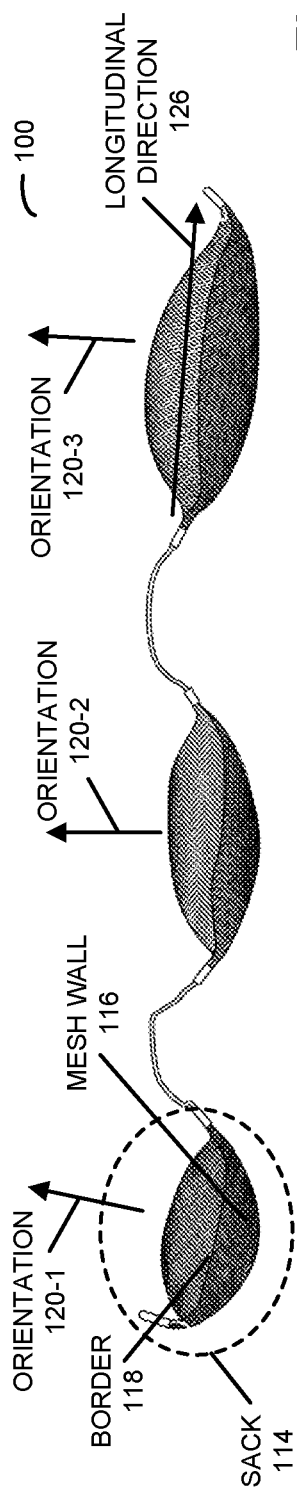
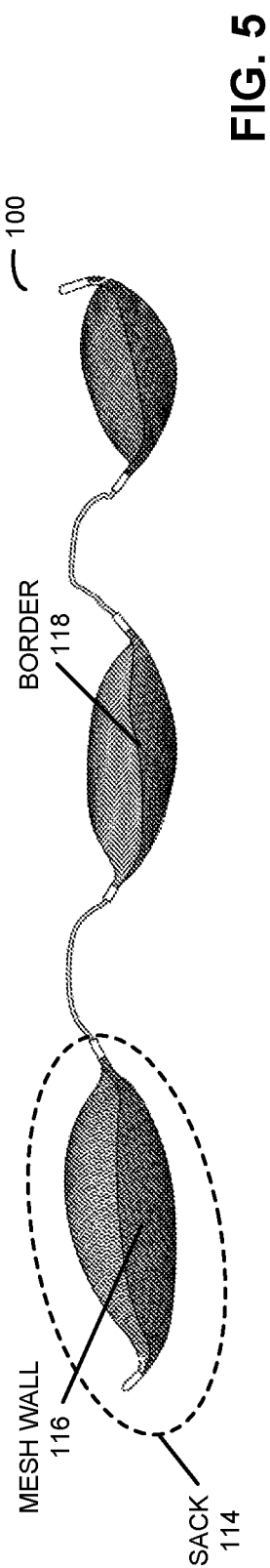
FIG. 4
FIG. 5
FIG. 6
FIG. 7

REINFORCEMENT DEVICE FOR INTRASACCULAR TREATMENT OF AN ANEURYSM

CROSS REFERENCE TO RELATED APPLICATIONS

This application claims priority under 35 U.S.C. 119(e) to: U.S. Provisional Application Ser. No. 63/060,143, "Flexible Device for Intrasaccular Treatment of an Aneurysm," filed on Aug. 3, 2020, by Maria G. Aboytes, and U.S. Provisional Application Ser. No. 63/056,466, "Flexible Device for Intrasaccular Treatment of an Aneurysm," filed on Jul. 24, 2020, by Maria G. Aboytes, the contents of both of which are herein incorporated by reference.

FIELD

The described embodiments relate to techniques for treating an aneurysm using a reinforcement device with multiple mesh elements mechanically coupled by a connector that allows the mesh elements to independently change their orientation with respect to each other.

BACKGROUND

An aneurysm is an excessive localized enlargement of an artery caused by a weakening of the artery wall. Treatment for an aneurysm depends on the location, size and condition of the aneurysm, and can vary from watchful waiting to emergency surgery. For example, treatment for an aneurysm may include: a medical procedure (such as stenting, embolization, endovascular coiling or clipping), medications (such as antihypertensive drug or an anticoagulant drug), surgery (such as endovascular aneurysm repair or vascular grafting). However, using existing treatments, it can be difficult to treat an aneurysm that has an irregular shape, such as an aneurysm that is bi-lobed.

SUMMARY

A reinforcement device is described. This reinforcement device may include mesh elements (such as two mesh elements) arranged in a sequence and spatially offset from each other along a sequence direction, where a given mesh element includes a sack having a mesh wall, an opening defined by a border, and an orientation along a normal direction perpendicular to the opening. Moreover, the reinforcement device may include one or more connectors, where a given connector has a length and is mechanically coupled to adjacent mesh elements in the sequence. Note that the one or more connectors may be configured to or may allow the orientation of the given mesh element to change, independent of orientations of a remainder of the mesh elements, by rotating about a longitudinal direction in a plane of the opening and perpendicular to the orientation.

Moreover, in an initial state of the reinforcement device, adjacent mesh elements in the sequence may have different orientations. For example, the different orientations may be approximately opposite from each other (such as within 30° of a 180° difference in orientation).

Furthermore, a first mesh element in the mesh elements may be configured to or may be able to nest inside the sack of a second mesh element in the mesh elements via the opening of the sack in the second mesh element. Additionally, the first mesh element and the second mesh element in the mesh elements may be configured to nest inside the sack of a third mesh element in the mesh elements via the opening of the sack in the third mesh element.

In some embodiments, at least two of the mesh elements may have: different sizes, different stiffnesses, and/or different density of openings defined by borders in at least the two of the mesh elements.

Note that the one or more connectors may have a lower stiffness than the mesh elements.

Moreover, the sack may have an initial shape that includes: an oval, a square, a triangle, a concave shape, a ribbon, a cup, or a flat shape. The initial shape may be configured to or may be able to conform to a shape of an aneurysm sack or the aneurysm neck of an aneurysm when the given mesh element is in contact with the aneurysm sack or the aneurysm neck.

Furthermore, the mesh elements may be braided or woven.

Additionally, the mesh elements may include: platinum, nitinol, stainless steel, cobalt, chromium, and/or a polymer.

In some embodiments, the one or more connectors may be radiopaque.

Note that the one or more connectors may have a curved shape (e.g., in 2D or 3D). Alternatively, the one or more connectors may be straight.

Moreover, the one or more connectors may include: a coil, a cable, a chain, a braided material, and/or a polymer.

Furthermore, the given connector may be mechanically coupled to the given mesh element by a tubular band. The tubular band may be radiopaque.

Additionally, the reinforcement device may be configured for deployment using a catheter via a cable or a tube, where a first mesh element is configured to or is able to detachably couple to the cable or the tube.

Another embodiment provides a method of deploying a reinforcement device in an aneurysm. During the method, a distal portion of a catheter is positioned into an aneurysm sack or an aneurysm neck of the aneurysm. Then, a first mesh element in a reinforcement device is deployed, via a catheter, into the aneurysm to at least partially cover the aneurysm neck of the aneurysm. Moreover, a second mesh element in the reinforcement device is deployed into the first mesh element, where the second mesh element is nested into the first mesh element. Next, a cable or a tube is detached from the reinforcement device. Furthermore, the catheter is removed from the aneurysm sack or the aneurysm neck, where the first mesh element and the second mesh element in the reinforcement device are arranged in a sequence and are spatially offset from each other along a sequence direction. Additionally, a given mesh element may include: a sack having a mesh wall, an opening defined by a border, and an orientation along a normal direction perpendicular to the opening. Note that the first mesh element and the second mesh element are mechanically coupled by a connector having a length. The connector is configured to or may be able to allow the orientation of the second mesh element to change, independent of the orientation of the first mesh element, by rotating about a longitudinal direction in a plane of the opening and perpendicular to the orientation.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and

BRIEF DESCRIPTION OF THE FIGURES

FIG. 4 is a block diagram illustrating an example of reinforcement device in accordance with an embodiment of the present disclosure.

FIG. 5 is a block diagram illustrating an example of reinforcement device in accordance with an embodiment of the present disclosure.

FIG. 6 is a block diagram illustrating an example of reinforcement device in accordance with an embodiment of the present disclosure.

FIG. 7 is a block diagram illustrating an example of reinforcement device in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

A reinforcement device is described. This reinforcement device may include mesh elements (such as two mesh elements) arranged in a sequence and spatially offset from each other along a sequence direction, where a given mesh element includes a sack having a mesh wall, an opening defined by a border, and an orientation along a normal direction perpendicular to the opening. Moreover, the reinforcement device may include one or more connectors, where a given connector has a length and is mechanically coupled to adjacent mesh elements in the sequence. Note that the one or more connectors may be configured to or may allow the orientation of the given mesh element to change, independent of orientations of a remainder of the mesh elements, by rotating about a longitudinal direction in a plane of the opening and perpendicular to the orientation.

The reinforcement device may facilitate the treatment of an aneurysm, such as an aneurysm that has an irregular shape. For example, the ability to rotate and independently change the orientation(s) of the mesh elements may allow the mesh elements to be nested together to reinforce an aneurysm. Notably, during deployment, a first mesh element in the reinforcement device may be deployed, via a catheter, into an aneurysm sack to at least partially cover an aneurysm neck of the aneurysm. Moreover, a second mesh element in the reinforcement device may be deployed into the first mesh element, where the second mesh element is nested into the first mesh element. Furthermore, an initial shape of the first mesh element may be configured to or may be able to conform to a shape of the aneurysm sack or the aneurysm neck of the aneurysm when the given mesh element is in contact with the aneurysm sack or the aneurysm neck. These capabilities of the reinforcement device may facilitate improved treatment of aneurysms, which may reduce patient suffering or mortality, and may reduce the time, cost and/or expense of the treatment.

Figure 1:
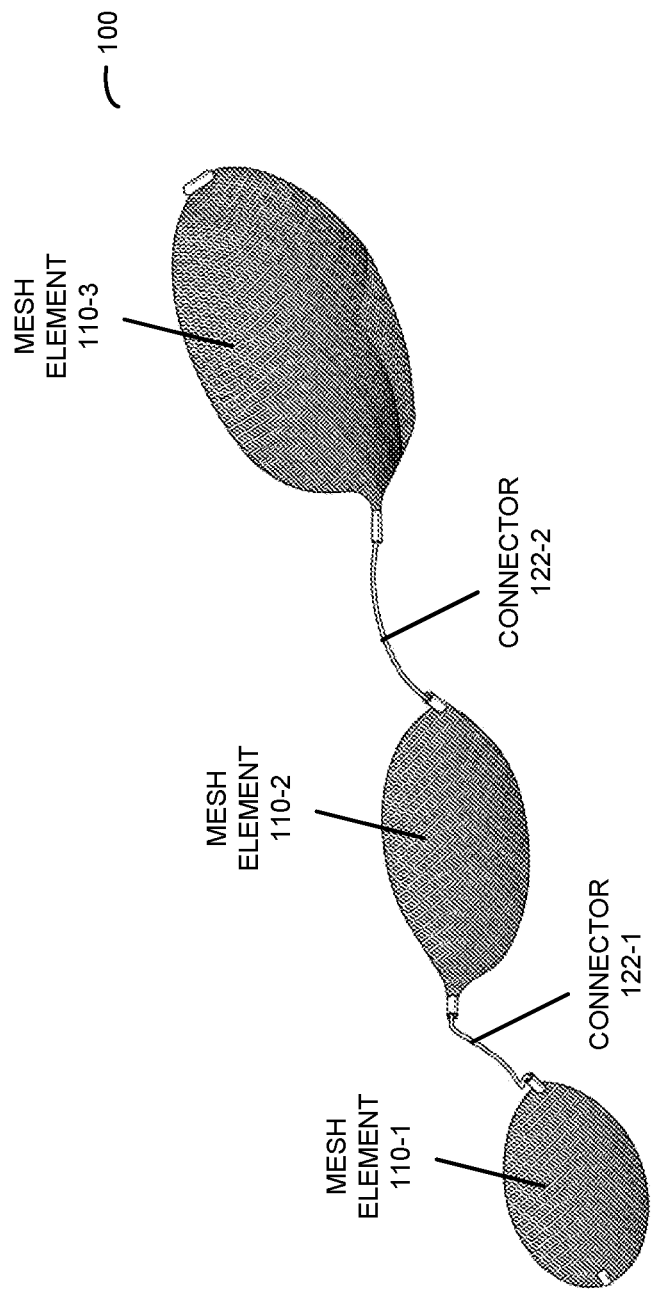
FIG. 1 is a block diagram illustrating an example of reinforcement device in accordance with an embodiment of the present disclosure.
Figure 2:
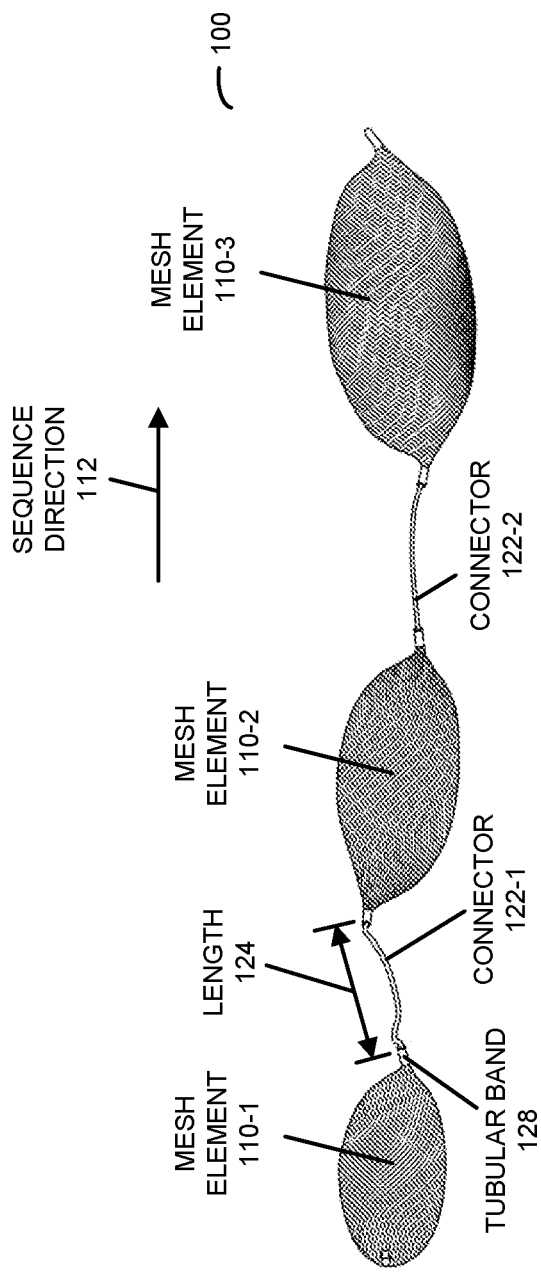
FIG. 2 is a block diagram illustrating an example of reinforcement device in accordance with an embodiment of the present disclosure.
Figure 3:
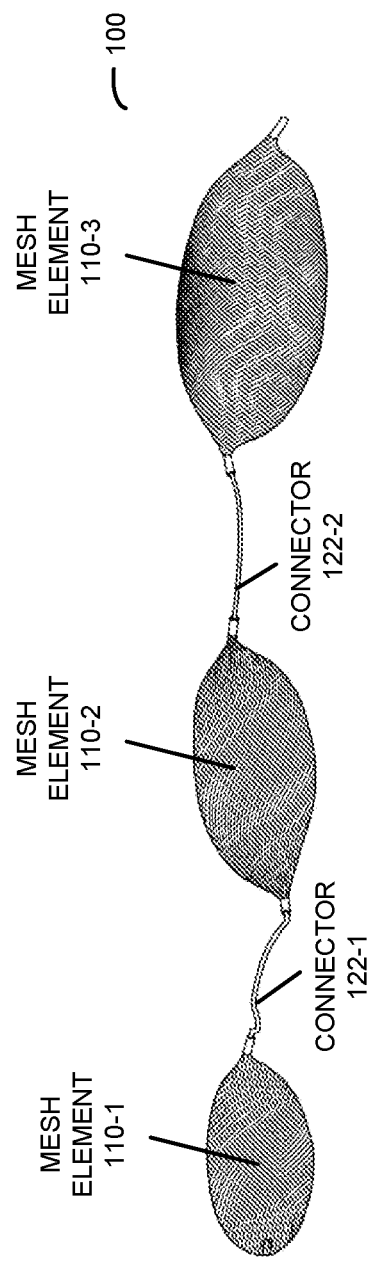
FIG. 3 is a block diagram illustrating an example of reinforcement device in accordance with an embodiment of the present disclosure.

We now discuss embodiments of the reinforcement device. FIG. 1 presents a block diagram illustrating a perspective view of an example of reinforcement device 100. Moreover, FIGS. 2 and 3 present block diagrams illustrating, respectively, bottom and top views of an example of reinforcement device 100. FIGS. 4 and 5 present block diagrams illustrating, respectively, side views of an example of reinforcement device 100. Furthermore, FIGS. 6 and 7 present block diagrams illustrating, respectively, front and back views of an example of reinforcement device 100 with nested mesh elements. Thus, FIGS. 1-5 present expanded views of reinforcement device 100, and FIGS. 6 and 7 present collapsed views of reinforcement device 100 (which is how reinforcement device 100 will look when deployed in an aneurysm).

As shown in FIGS. 1-7, reinforcement device 100 may include mesh elements 110 (such as two mesh elements) arranged in a sequence and spatially offset from each other along a sequence direction 112, where a given mesh element (such as mesh element 110-1) includes a sack (such as sack 114) having a mesh wall (such as mesh wall 116), an opening defined by a border (such as border 118), and an orientation (such as orientation 120-1) along a normal direction perpendicular to the opening.

Moreover, reinforcement device 100 may include one or more connectors 122, where a given connector (such as connector 122-1) has a length (such as length 124) and is mechanically coupled to adjacent mesh elements in the sequence. Note that the one or more connectors 122 may be configured to or may allow the orientation of the given mesh element to change, independent of orientations of a remainder of the mesh elements 110, by rotating about a longitudinal direction (such as direction 126) in a plane of the opening and perpendicular to the orientation.

Note that, in an initial state of reinforcement device 100, adjacent mesh elements 110 in the sequence may have different orientations 120. For example, the different orientations 120 may be approximately opposite from each other (such as within 30° of a 180° difference in orientations 120).

Furthermore, a first mesh element (such as mesh element 110-3) in mesh elements 110 may be configured to or may be able to nest inside the sack of a second mesh element (such as mesh element 110-2) in mesh elements 110 via the opening of the sack in the second mesh element. Additionally, the first mesh element and the second mesh element in mesh elements 110 may be configured to nest inside the sack of a third mesh element (such as mesh element 110-1) in mesh elements 110 via the opening of the sack in the third mesh element. The resulting nested structure resembles the views shown in FIGS. 6 and 7, and may be used to reinforce an aneurysm in situ.

In some embodiments, at least two of mesh elements 110 may have: different sizes, different stiffnesses, and/or different density of openings defined by borders in at least the two of the mesh elements. For example, the first mesh element may have a smaller stiffness relative to the second mesh element, which in turn may have a smaller stiffness than the third mesh element. Note that the one or more connectors 122 may have a lower stiffness than mesh elements 110. Alternatively or additionally, the reinforcement device may include at least two mesh elements 110.

The proximal mesh element may be smaller in size, so when deployed in an aneurysm it may not displace the larger mesh element that may be deployed in the aneurysm neck. The second mesh element may provide an anchor to prevent the first mesh element from being pushed or displaced by blood flow.

Moreover, the sack may have an initial shape that includes: an oval, a square, a triangle, a concave shape, a ribbon, a cup, or a flat or a planar shape. The initial shape may be configured to or may be able to conform to a shape of an aneurysm sack or the aneurysm neck of an aneurysm when the given mesh element is in contact with the aneurysm sack or the aneurysm neck. For example, the mesh elements may initially be flat, but when they come in contact with the aneurysm wall the mesh elements may expand into a 3D sphere to fill the space in the aneurysm sack and to anchor the reinforcement device in place in the aneurysm. Furthermore, mesh elements 110 may be braided or woven. Additionally, mesh elements 110 may include: platinum, nitinol, stainless steel, cobalt, chromium, and/or a polymer.

In some embodiments, the one or more connectors 122 may be radiopaque. This may allow reinforcement device 100 to be visible during an invasive cardiology procedure, such as using fluoroscopic imaging.

Note that the one or more connectors 122 may have a curved shape (e.g., in 2D or 3D). Alternatively, the one or more connectors 122 may be straight. Moreover, the one or more connectors 122 may include: a coil, a cable, a chain, a braided material, and/or a polymer. Furthermore, the given connector may be mechanically coupled to the given mesh element by a tubular band (such as tubular band 128). This tubular band may be radiopaque.

Figure 8:
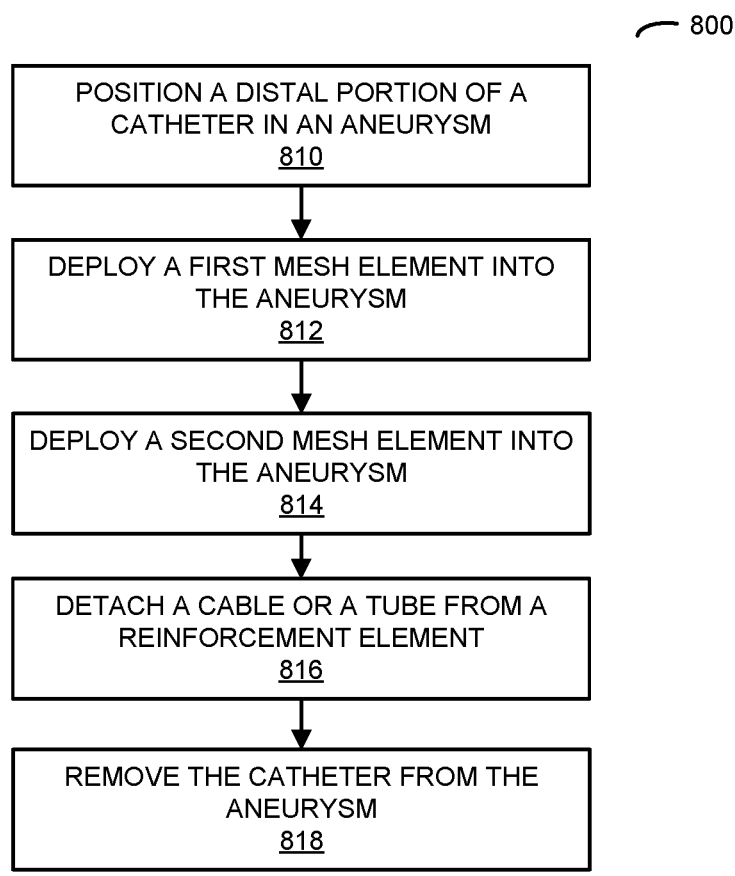
FIG. 8 is a flow diagram illustrating an example of a method for deploying a reinforcement device in an aneurysm in accordance with an embodiment of the present disclosure.

Additionally, as described further below with reference to FIG. 8, reinforcement device 100 may be configured for deployment using a catheter via a cable or a tube, where a first mesh element is configured to or is able to detachably couple to the cable or the tube.

In some embodiments, the reinforcement device may be used to treat an aneurysm neck of a vascular aneurysm. More generally, the reinforcement device may be used to treat a region in a vessel (which conveys a liquid or a fluid) having reduced mechanical strength or integrity relative to a remainder of the vessel.

The idea behind the reinforcement device is to have at least two mesh elements along the reinforcement device connected with a flexible or non-rigid connector to allow the mesh elements to deploy independent of each other. The first mesh element may be deployed into an aneurysm sack and positioned across an aneurysm neck to prevent blood flow to come into the aneurysm. The subsequent mesh elements(s) may be deployed in the aneurysm dome and aneurysm sack to anchor the reinforcement device in place.

The use of a deflectable microcatheter may be beneficial to deploy the reinforcement device in the correct locations in the aneurysm, such as when the aneurysm shape is irregular or bi-lobed. The flexible connectors may allow the mesh elements to be deployed where they need to go because they act independent of each other due to the flexibility of the flexible connectors.

As noted previously, the flexible connectors may be radiopaque. For example, a given connector may include a flexible: coil, cable, laser-cut element, chain, or polymer. The given connector may include a radiopaque element. The shape of the connectors may be straight, curved or 3D. Note that the mesh elements and the flexible connectors may be attached to each other by a tubular radiopaque band.

The mesh elements may cover a large surface area on the aneurysm sack, which may allow the reinforcement device to be short in length when compared to coils or other existing intrasaccular linear devices. Moreover, the mesh elements may be braided or woven out of platinum, nitinol, stainless steel, cobalt, chromium, a polymer, or a combination of any of these materials, but not limited to these materials. In some embodiments, the mesh elements may be fabricated using drawn-filled tubes or cables. Note that the mesh elements may have oval, square, triangular, concaved, and/or flat shapes. The mesh elements may have the same size and shape. Alternatively, the mesh elements may include a combination of large and small sizes, or a combination of shapes.

In some embodiments, the mesh elements and the connectors are constructed or fabricated from the same material, such as a single piece of mesh. In these embodiments, the connectors may be long enough to allow the mesh elements to be deployed independently of each other.

Moreover, in some embodiments of the reinforcement device, the mesh elements may be formed in the same plane (one on top of the other). The first mesh element may have a higher density and/or stiffness to allow it to deploy at the neck of the aneurysm and to anchor itself without collapsing into the blood vessel when deployed into an aneurysm neck. The other(s) mesh elements may have smaller density and/or stiffness to allow then to confirm to or follow the aneurysm shape and in order to anchor themselves into the aneurysm dome, thereby preventing the reinforcement device from compacting because of blood flow.

Furthermore, the reinforcement device may be delivered by a detachment system into the aneurysm. Once placed in the aneurysm neck, the reinforcement device may be detached from the detachment system.

In some embodiments, the aneurysm-neck-protection mesh element is mounted on a tube that has a release mechanism to detached once the reinforcement device is deployed in the aneurysm. In these embodiments, the reinforcement device may be deployed on the aneurysm neck and one or more subsequent mesh element(s) (which may be included in the same reinforcement device or a separate reinforcement device) may be deployed through the delivery tube to anchor the aneurysm-neck-protection mesh element in place. Once the aneurysm neck is protected and the aneurysm is filled, the aneurysm-neck-protection mesh element may be detached from the delivery tube.

We now describe embodiments of the method. FIG. 8 presents a flow diagram illustrating an example of a method 800 for deploying a reinforcement device in an aneurysm. During the method, a distal portion of a catheter is positioned (operation 810) into or proximate to an aneurysm sack or an aneurysm neck of the aneurysm. For example, a deflectable catheter may be positioned into the aneurysm using catheter techniques in invasive cardiology.

Then, a first mesh element in a reinforcement device is deployed, via a catheter, into the aneurysm (operation 812) to at least partially cover the aneurysm neck of the aneurysm. Moreover, a second mesh element in the reinforcement device is deployed into the first mesh element (operation 814), where the second mesh element is nested into the first mesh element.

Next, a cable or a tube is detached from the reinforcement device (operation 816). Furthermore, the catheter is removed from the aneurysm (operation 818), where the first mesh element and the second mesh element in the reinforcement device are arranged in a sequence and are spatially offset from each other along a sequence direction.

Note that a given mesh element may include: a sack having a mesh wall, an opening defined by a border, and an orientation along a normal direction perpendicular to the opening. Moreover, the first mesh element and the second mesh element may be mechanically coupled by a connector having a length. The connector may be configured to or may be able to allow the orientation of the second mesh element to change, independent of the orientation of the first mesh element, by rotating about a longitudinal direction in a plane of the opening and perpendicular to the orientation.

In some embodiments of method 800, there may be additional or fewer operations. For example, one or more additional mesh elements in the reinforcement device may be deployed into the aneurysm, such as into a sack of one of the other mesh elements. Furthermore, the order of the operations may be changed, and/or two or more operations may be combined into a single operation.

Although the reinforcement device is described with specific components and materials, in alternative embodiments, different components may be used. For example, the reinforcement device may include one or more additional mesh elements and/or connections. Additionally, one or more of the components may not be present in the reinforcement device. Moreover, in some embodiments, the reinforcement device may include one or more additional or different components that are not shown in FIGS. 1-7. Also, although separate components are shown in FIGS. 1-7, in some embodiments some or all of a given component can be integrated into one or more of the other component(s) in the reinforcement device.

Furthermore, the reinforcement device may use a wide variety of materials, including: a metal, a semiconductor, an insulator, an organic chemical and/or an inorganic chemical. For example, the reinforcement device may include a glue or a polymer. In some embodiments, one or more of the materials in the reinforcement device may be bio-absorbable or bio-degradable, such as after a time interval of 3 or 6 mo.

Additionally, the reinforcement device may be fabricated using a variety of techniques, including: weaving, deposition, etching, sputtering, laser cutting, soldering, etc. More generally, the reinforcement device may be fabricated using an additive process and/or a subtractive process.

Note that the use of the phrases 'capable of,' 'capable to,' 'operable to,' or 'configured to' in one or more embodiments, refers to some apparatus, hardware, and/or element designed in such a way to enable use of the apparatus, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure.

Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A reinforcement device, comprising:
    mesh elements arranged in a sequence and spatially offset from each other along a sequence direction, wherein each given mesh element comprises a sack having a mesh wall, an opening defined by a border, and an orientation along a normal direction that is perpendicular to the opening, and
    one or more connectors, wherein each given connector of the one or more connectors has a length and is mechanically coupled to adjacent mesh elements in the sequence,
    wherein the one or more connectors are configured to allow the orientation of the given mesh element to change, independent of orientations of a remainder of the mesh elements, by rotating about a longitudinal direction in a plane of the opening and perpendicular to the orientation, and
    wherein, when in contact with an aneurysm sack of an aneurysm, the mesh elements are configured anchor to the aneurysm sack and dynamically conform to an aneurysm shape of the aneurysm.

2. The reinforcement device of claim 1, wherein the mesh elements consist of two mesh elements.

3. The reinforcement device of claim 1, wherein, in an initial state of the reinforcement device, adjacent mesh elements in the sequence have different orientations.

4. The reinforcement device of claim 3, wherein the different orientations are approximately opposite from each other.

5. The reinforcement device of claim 1, wherein a first mesh element in the mesh elements is configured to nest inside the sack of a second mesh element in the mesh elements via the opening in the second mesh element.

6. The reinforcement device of claim 5, wherein the first mesh element and the second mesh element in the mesh elements are configured to nest inside the sack of a third mesh element in the mesh elements via the opening in the third mesh element.

7. The reinforcement device of claim 1, wherein at least two of the mesh elements have different sizes, different stiffnesses, or different density of openings defined by the borders in at least the two of the mesh elements.

8. The reinforcement device of claim 1, wherein the one or more connectors have a lower stiffness than the mesh elements.

9. The reinforcement device of claim 1, wherein the sack has an initial shape comprising: an oval, a square, a triangle, a concave shape, a ribbon, a cup, or a flat shape.

10. The reinforcement device of claim 9, wherein the initial shape is configured to conform to a shape of an aneurysm neck of the aneurysm when the given mesh element is in contact with the aneurysm sack or the aneurysm neck.

11. The reinforcement device of claim 1, wherein the mesh elements are braided or woven.

12. The reinforcement device of claim 1, wherein the mesh elements comprise one or more of: platinum, nitinol, stainless steel, cobalt, chromium, or a polymer.

13. The reinforcement device of claim 1, wherein the one or more connectors are radiopaque.

14. The reinforcement device of claim 1, wherein the one or more connectors have a curved shape.

15. The reinforcement device of claim 1, wherein the one or more connectors comprise: a coil, a cable, a chain, a braided material, or a polymer.

16. The reinforcement device of claim 1, wherein the given connector is mechanically coupled to the given mesh element by a tubular band.

17. The reinforcement device of claim 16, wherein the tubular band is radiopaque.

18. The reinforcement device of claim 1, wherein the reinforcement device is configured for deployment using a catheter via a cable or a tube; and
 wherein a first mesh element is configured to detachably couple to the cable or the tube.

* * * * *